Feb. 5, 1957
H. J. LEE
2,780,244
INSERTABLE STOPPER VALVE
Filed Nov. 12, 1954
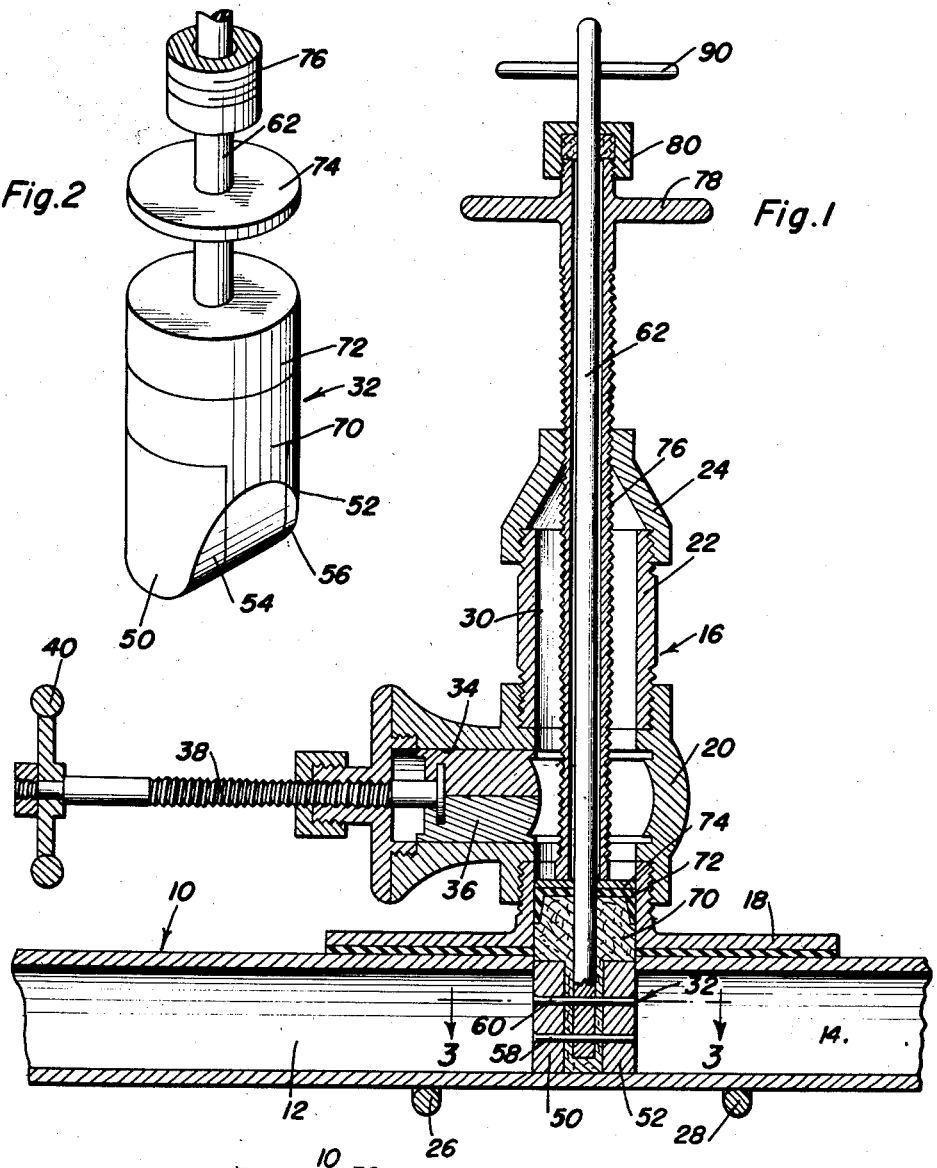
Harold J. Lee
INVENTOR.
BY
Attorneys

United States Patent Office 2,780,244
Patented Feb. 5, 1957

2,780,244
INSERTABLE STOPPER VALVE

Harold J. Lee, Cody, Wyo., assignor of one-third to Cody Gas Company, Cody, Wyo., a corporation of Wyoming Application November 12, 1954, Serial No. 468,319

2 Claims. (Cl. 138—94)

This invention relates generally to valve mechanisms, and pertains more particularly to a stopper valve mechanism for closing off a section of a public service main, such as water, oil or gas pipe, for the purpose of making extensions or repairs.

In making a repair in a public service main or forming extensions thereon, it is conventional practice to insert a temporary stopper valve mechanism into the main or service line closely adjacent the point at which the repair or extension is to be made to obviate the necessity of shutting down operation of the main over an extended portion of its length which may be necessitated if only originally installed shut-off valves were to be utilized.

It is therefore a primary object of this invention to provide an improved form of stopper valve for the purpose above described.

Another object of this invention is to provide improvements in stopper valves in which the final sealing engagement with the surface main is effected by a deformable material by virtue of effecting a compressive force at some remote point on the deformable material to cause it to perform the sealing engagement.

A further object of this invention is to provide an improved form of stopper valve mechanism which incorporates a rigid head assembly having a peripheral groove therein in close proximity to the inner surface of the service main with which it is associated and wherein the deformable material is disposed so as to fill the chamber within the head and wherein mechanism is provided for effecting a compressive force on the deformable material to cause it to be extruded outwardly from the chamber into close engagement with the interior surface of an associated gas main or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a sectional view showing the improved stopper valve in operation;

Figure 2 is a perspective view of the stopper assembly; and

Figure 3 is a horizontal section taken substantially along the plane of section line 3—3 in Figure 1.

Referring now more particularly to the drawings, reference numeral 10 indicates generally a gas main, oil line or water line or the like which is, as is conventionally provided, of cylindrical or other configuration. For the purpose of this illustration, the reference numeral 12 will indicate the downstream side of the conduit or main whereas the reference numeral 14 indicates the upstream side thereof.

The stopper valve assembly incorporates an elongated body member indicated generally by the reference character 16 which will be seen to consist of a plurality of associated parts, such as the saddle portion 18, the globe portion 20, the nipple 22 and the cap 24.

The saddle 18 is rigidly secured to the main 10 by means of suitable U-bolt members 26 and 28, and the various portions 18, 20, 22 and 24 are fitted together in the manner which will be clearly apparent from Figure 1. The members 18, 20 and 22 present a longitudinal bore 30 therethrough within which the stopper assembly, which is indicated generally by the reference character 32, is slidably disposed.

At this point, it may be well to relate that the specific configuration of the body member 16 is insofar as this invention is concerned, of negligible importance, it being necessary only that the body member 16 provide a longitudinal bore 30 therethrough for the purpose of slidably receiving the stopper member 32, as will be hereinafter set forth more clearly. The specific embodiment of the body member 16 which is illustrated in the drawings is intended only to show a complete mechanism for effecting all of the series of operations necessary for introducing the stopper valve into an existing main or supply line without interrupting the flow therethrough.

For this purpose, the globe will be seen to incorporate a recess 34 which intersects the bore 30 and which has slidably disposed therein a valve mechanism indicated by the reference character 36. Associated with the valve 36 is an actuating stem member 38 having a hand wheel portion 40 thereon such that manipulation of the hand wheel, as will be obvious, will move the valve 36 from the position shown in Figure 1 to a position in which it closes off the bore 30.

In the usual operation of such mechanisms wherein it is desired to tap into an existing supply line while the same is carrying its supply fluid in the usual manner, it is conventional to insert a piloted shell miller or cutter member into the bore 30, the cap 24 being removed, and impart rotation to this mechanism so as to cut away a portion of the main 10 which will be of approximately the same diameter as the interior of the bore 30. The cutting assembly is then withdrawn to a point above the valve mechanism 36 and the valve mechanism 36 is then moved to the shutting off position, whereafter the cutting mechanism may be completely removed and the stopper mechanism and its associated parts inserted within the bore and the cap 24 threaded into place as shown in Figure 1. Thereafter, the valve 36 may be withdrawn to the Figure 1 position, and the stopper valve is then ready to be inserted in proper position within the main.

The stopper 32 will be seen to consist of a pair of plate members 50 and 52 disposed in spaced apart relationship and each having a shaped lower end portion 54 and 56 such that the two will conform to the interior wall surface of the main 10 when they are projected thereinto through the lower end of the bore 30, in the manner illustrated in Figure 1. In this respect, it will be noted that the plates 50 and 52 are disposed transversely of the axis of the main or, more specifically, in the manner illustrated in Figure 3.

The two plate members 50 and 52 are rigidly interconnected by rivets or pin members 58 and 60 and these rivets or pins also extend through the lower end of a rod member 62 which extends upwardly from the plates and is of sufficient length as to extend exteriorly of the body assembly 16, in the manner shown.

It is important to note that the plates 50 and 52 are of such vertical height as to extend above the inner periphery of the main 10. That is, it is essential that the plates 50 and 52 extend entirely across the inner diameter of the main.

A quantity of deformable material, such as rubber, any rubber-like material, putty, plastic material or the like, as indicated by the reference character 70, is disposed between the plate members 52 and 50 and some of the material extends above the upper ends of these plates in the manner shown such as to completely extend across and fill up a portion of the bore 30. An inverted cup-shaped cap member 72 may be inserted over the upper end of the deformable material, and a plunger disk 74 rests upon this cap, in the manner shown. The cap member 24 previously described has threadedly engaged therewith a plunger member 76 provided at its upper end with a hand wheel element 78 and a packing gland member 80 surrounding the upper end portion of the rod 62, and it will be manifest that with the assemblage in the position shown in Figure 1, the proper manipulation of the hand wheel 78 will effect downward movement of the plunger 76 and consequently compression of the deformable material 70 such that it will be extruded outwardly from between the plate members 50 and 52 and into close contact with the inner wall surface of the service main 10.

In actual use, it will be appreciated that when the stopper assembly 32 is inserted within the bore 30 and the cap 24 threaded in place, the pin or handle member 90 which is provided at the upper end of the rod 62 will serve as a guide for properly positioning the plates with respect to the service main. That is, the pin member 90 may be positioned such that when it extends longitudinally with respect to the service main, the plate members 50 and 52 will be disposed transversely of the main.

It will be readily apparent that with the above described assembly, a complete shut-off of fluid flow will be effected even should the pipe be extremely tuberculated. It will also be appreciated that the material 70, being confined within the lower portion of the bore 30 and between the plate members 50 and 52, can be formed of many different types of material, even to readily deformable material, such as putty or the like. Further, it is to be understood that the specific shape of the stopper element need not be as particularly set forth in the drawings and described herein insofar as the rigid portion thereof is concerned. That is, instead of being formed from two separate plate members 50 and 52, the rigid head may be formed of a single piece of material having a peripheral groove therearound to provide a chamber communicating with the bore 30 into which the deformable material is packed and outwardly from which the material is deformed as the plunger is actuated downwardly.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In an insertable valve assembly for shutting off flow within a gas main or the like, a body member adapted to be secured to a main, said body having a bore therein adapted to communicate with the interior of a main through a registering aperture therein, a stopper member slidably disposed in said bore, said stopper including a pair of spaced plates having rounded end portions adapted to contact the inner surface of a main, means interconnecting said plates, a quantity of deformable material disposed between and above said plates, and means for exerting a compressive force upon said deformable material to deform it outwardly from between said plates into close contact with the inner surface of the main, said means including a plunger threadedly engaged in said body concentrically of said bore, a plunger disk disposed between said plunger and said deformable material, said disk being of such diameter as to peripherally engage the inner surface of said bore whereby movement of said plunger will effect compression of said deformable material to deform it outwardly from the area between the plates.

2. A stopper valve construction comprising, an elongated body having a longitudinal bore therethrough, a stopper slidably disposed in said bore, said stopper including a pair of independent spaced plate members having rounded lower ends, means for rigidly interconnecting said plates, a quantity of deformable material disposed between said plates and above the same within said bore, a tubular plunger threadedly engaged in said body concentrically of said bore, a plunger disk disposed between said plunger and said deformable material, said disk being of such diameter as to peripherally engage the inner surface of said bore, whereby movement of said plunger will effect compression of the deformable material and force the same outwardly from between said plates, an elongated rod attached to said interconnecting means and extending upwardly through said tubular plunger, and a handle on the upper end of said rod for positioning the stopper.

References Cited in the file of this patent

UNITED STATES PATENTS

| | | |
|---|---|---|
| 834,393 | Meister | Oct. 30, 1906 |
| 2,272,734 | Witt | Feb. 10, 1942 |
| 2,487,991 | Stephens | Nov. 15, 1949 |